(12) United States Patent  
Guerreiro et al.

(10) Patent No.: US 7,862,240 B2
(45) Date of Patent: Jan. 4, 2011

(54) BEARING DEVICE

(75) Inventors: Sergio Stefano Guerreiro, Sorocaba-SP (BR); Gérard Barbezat, Opfikon (CH)

(73) Assignee: ThyssenKrupp Technologies AG, Essen (DE)

( * ) Notice: Subject to any disclaimer, the term of this patent is extended or adjusted under 35 U.S.C. 154(b) by 782 days.

(21) Appl. No.: 11/663,026

(22) PCT Filed: Sep. 10, 2005

(86) PCT No.: PCT/EP2005/009757

§ 371 (c)(1),
(2), (4) Date: Aug. 13, 2007

(87) PCT Pub. No.: WO2006/029785

PCT Pub. Date: Mar. 23, 2006

(65) Prior Publication Data

US 2008/0112659 A1    May 15, 2008

(30) Foreign Application Priority Data

Sep. 17, 2004  (EP)  ................................ 04405594

(51) Int. Cl.
*F16C 33/06* (2006.01)
(52) U.S. Cl. ...................... 384/276; 384/913
(58) Field of Classification Search ................ 384/276, 384/288, 294, 912, 913
See application file for complete search history.

(56) References Cited

U.S. PATENT DOCUMENTS

| 3,656,823 | A | * | 4/1972 | Tiraspolsky et al. | ......... 384/306 |
| 3,891,287 | A |   | 6/1975 | Vogt |  |
| 4,666,318 | A |   | 5/1987 | Harrison |  |
| 5,346,314 | A | * | 9/1994 | Perratone et al. | ............... 384/97 |
| 6,560,869 | B1 | * | 5/2003 | Schlegel et al. | .......... 29/888.09 |
| 6,939,049 | B2 | * | 9/2005 | Schubert | ..................... 384/294 |
| 2001/0021353 | A1 |   | 9/2001 | Sakai et al. |  |

FOREIGN PATENT DOCUMENTS

| AT | 397 985 B | 8/1994 |
| JP | 62-20922 | 9/1987 |
| WO | WO 99/06722 | 2/1999 |
| WO | WO 2004/067793 A2 | 8/2004 |
| WO | WO 2005/042993 A1 | 5/2005 |

* cited by examiner

*Primary Examiner*—Thomas R Hannon
(74) *Attorney, Agent, or Firm*—Crowell & Moring LLP

(57) ABSTRACT

Bearing device (1) with a first bearing part (2) and a second bearing part (3) which cooperate in bearing contact, wherein the first bearing part (2) and the second bearing part (3) is each provided with a surface layer (21, 31), wherein the hardness of the surface layer (21) of the first bearing part (2) is greater than the hardness of the surface layer (31) of the second bearing part (3).

20 Claims, 3 Drawing Sheets

BEARING DEVICE

The invention relates to a bearing device in accordance with the preamble of the independent claim 1.

Sliding and rolling bearings constitute the overwhelming part of the bearings used in the art. The term bearing is to be understood hereinunder to mean all parts defining the function of the bearing and rolling or sliding on one another.

Signs of wear, in particular on the bearing running surfaces, are usually associated with the friction produced on the bearing running surfaces which roll and/or slide on one another. In order that these signs of wear do not make it necessary to change the whole bearing device bearing shells are used, amongst other things, in sliding bearings and can be replaced when they are worn out. However, the construction of the sliding bearing is thereby rendered substantially more complex and a cost-intensive maintenance process is also required when changing the bearing shells.

In order to mount crank shafts and connecting rods in internal combustion engines sliding bearings, in particular divided sliding bearings with bearing shells, are often used for example. There is also some use of combined mounting in sliding and rolling bearings. The crank shafts are usually produced from forged steels or cast irons with spheroidal graphite, cast steel, annealed cast iron or sintered materials. The bearing shells are usually produced as so-called two-layer or three-layer bearings. However, the production of such bearing shells is relatively troublesome. Where the machine has a high operational performance the bearing shells finally wear out to such a degree that it becomes necessary to change the bearing shells. The changing of the bearing shells in such machines is associated with high costs as already mentioned.

The object of the invention is thus to propose an improved bearing device which is simple in construction, with which the maintenance work is clearly reduced and the service life of the bearing device substantially extended.

The subject matter of the invention which achieves these objects in terms of apparatus is characterised by the features of the independent claim 1. The dependent claims relate to particularly advantageous embodiments of the invention.

The invention therefore relates to a bearing device with a first bearing part and a second bearing part which cooperate in bearing contact, wherein the first bearing part and the second bearing part are each provided with a surface layer, wherein the hardness of the surface layer of the first bearing part is greater than the hardness of the surface layer of the second bearing part.

Bearing contact is to be understood to mean that the first and the second bearing part move by sliding or rolling on each other or are mounted, e.g. statically, one inside another. When, within the scope of this application, it is stated that the bearing parts have a surface layer this is intended to mean that the bearing parts each have a bearing surface or running surface and these bearing or running surfaces are provided with a surface layer applied by thermal spraying. The running surface of the first and of the second bearing part are the surfaces with which the two bearing parts are in bearing contact.

With the two bearing parts having coatings of different hardness it is now possible to form these in an optimum manner with respect to their sliding properties and in so doing on the one hand to minimise the constructional complexity of the bearing device with respect to the prior art and on the other hand to significantly increase the service life of the bearing device. Thus it is now possible e.g. for the bearing shells to be omitted, i.e. the two bearing parts can be brought directly into bearing contact.

By the special selection and arrangement of the surface layers of different hardnesses it is achieved that amongst other things the frictional resistance between the two bearing parts is minimised and the tendency of the two bearing parts towards adhesive wear or towards galling, also called scuffing, is virtually absent.

It has been shown that when surface layers of similar hardness slide on each other increased wear is usually the result. This is based on the fact that e.g. in the case of relatively hard surface layers neither of the two layers has sufficiently high ductility to reduce the mechanical stresses which occur—and some of which are very severe—by deformation, in particular plastic deformation. As a result of this the parts of the two surfaces which cause the mechanical stresses are abraded, in particular they may break out.

Furthermore, it has been shown that when two relatively soft surface layers slide on one another a high level of friction and heat due to friction are generally produced. This friction is produced because, owing to the relatively high ductility of the two surface layers, these layers deform under contact pressure in such a way that they rub against each other over a relatively large portion of their whole running or bearing surface. Furthermore, the tendency of soft surface layers to stick to each other is usually greater than with hard surface layers. Owing to this property of the two surface layers, e.g. in the case where the layers slide on each other, parts of the surface are torn out, which in turn means increased wear and, in extreme cases, galling.

It is an essential fact behind the present invention that when a relatively hard surface layer slides or rolls over a relatively soft surface layer, as is the case with the bearing device in accordance with the invention, the above-mentioned wearing processes are absent to the greatest possible extent. The hard surface layer causes stresses in the soft surface layer which can, however, reduce these stresses owing to its relatively high ductility and can consequently not be damaged by them. Since the hard surface layer hardly adheres to the soft surface layer almost no surface components are torn out of this surface layer, and owing to the relatively low hardness of the soft surface layer this does not apply the forces necessary to damage the hard layer.

A further advantage of the special type and arrangement of the surface layers within the bearing device in accordance with the invention is that, in contrast to the bearing devices known from the prior art, the bearing device is not sensitive to possible contamination. This contamination may be small solid particles which—for instance, but not exclusively, in wet or liquid lubrication, in particular oil lubrication—pass between the running surfaces of the two bearing parts along with the oil. In the bearing devices known from the prior art this contamination causes e.g. grazing of the running surfaces of the bearing device, which leads to increased wear and therefore to premature failure of the bearing device. In the bearing device in accordance with the invention this contamination is embedded in certain regions in one or both surface layers and can thus no longer damage the surfaces or surface layers of the running surfaces of the two bearing parts.

In order additionally to exclude the possibility of damage to the running surfaces of the two bearing parts the surface layer is formed particularly hard on the base material of the first bearing part when the running surface of the second bearing part comprises the soft surface layer. Within the scope of this application base material is intended to mean the supporting material of the surface layer, e.g. the material of a crank shaft at the bearing site.

By pairing together the hardest possible surface layer with a relatively soft surface layer on a respective bearing part running surface optimal bearing results are achieved with respect to minimisation of friction and wear resistance of the bearing device.

Which bearing part is provided with which surface layer is dependent upon the actual demands placed on the bearing device. For example, it may be advisable to provide the bearing part which is easier to replace with the softer surface layer since this surface layer generally wears away earlier than the hard surface layer. However, the service life of the relatively soft surface layer is still greater by a multiple than that of a comparable element from the prior art, e.g. that of a bearing shell.

Of course, there are many other considerations which may have a role in the selection of the coatings of a roller.

The surface layers are explained in more detail hereinunder. The relatively soft copper base layer has the following composition:
zinc=5% to 30% by weight
tin=1% to 10% by weight
silicon=0.1% to 3% by weight
aluminium=0.1% to 7% by weight
iron=0.01% to 2% by weight
manganese=0.01% to 4% by weight
cobalt=0.01% to 3% by weight
copper=to make up to 100% by weight.

Hereinunder the term copper-containing surface layer is also used for the term copper base layer.

The iron base layer has the following composition:
carbon=0.1% to 1.5% by weight
manganese=0.1% to 8% by weight
sulphur=0.1% to 2% by weight
copper=0.1% to 12% by weight
iron=to make up to 100% by weight.

Hereinunder the term iron-containing surface layer is also used for the term iron base layer.

The iron-containing surface layer and its properties will first be explained hereinunder.

In one exemplified embodiment the bearing device in accordance with the invention is formed in such a way that the iron-containing surface layer additionally contains 0.01% to 0.2% by weight of phosphorous. Phosphorus considerably improves the mechanical strength of the surface layer and therefore increases its wear resistance.

In a further exemplified embodiment the bearing device is provided with an iron-containing surface layer which additionally contains 0.1% to 20% by weight of molybdenum and/or additionally 5% to 20% by weight of chromium. In particular the presence of chromium and molybdenum in the surface layer decisively increases its corrosion resistance e.g. with respect to aggressive substances which may be contained e.g. in a lubricant for lubricating a bearing or can be produced during operation of an internal combustion engine or reach the coated surface in some other way.

In order to improve the dry lubrication properties of the iron-containing surface layer the bearing device is formed in a further exemplified embodiment in such a way that the iron-containing surface layer contains MnS as a dry lubricant and the manganese portion is between 1% and 2.5% by weight, preferably 1.7% by weight and the sulphur portion is between 0.5% and 1.5% by weight preferably 1% by weight.

In order to further increase the good running properties, e.g. sliding properties, of the iron-containing surface layer the bearing device is formed in another exemplified embodiment in such a way that the iron-containing surface layer has a basic matrix of a-iron.

Furthermore, the bearing device can be formed in such a way that the iron-containing surface layer contains carbides, in particular $Fe_xC_y$, preferably $Fe_3C$. These carbides substantially increase the mechanical strength of the surface layer. The fine carbide particles hinder the migration of cracks in the surface layer and thereby stabilise this surface layer mechanically.

In order to achieve better properties in the bearing device with respect to sensitivity to dirt, i.e. in order to increase the service life of the bearing device, the iron-containing surface layer is formed in such a way that it has copper deposits which form softer separate phases as a copper matrix. These copper deposits have a good embedding capability with respect to small dirt particles, the size of which can be in the micrometer range e.g. around 1 µm. By this embedding of the dirt particles into the copper deposits the risk e.g. of damage to the surfaces, or the process generally known as "galling" is avoided.

The regions which contain the copper deposits have a relatively low hardness and can thus receive in particular hard foreign bodies which pass between the bearing parts of the bearing. This is effected by the foreign bodies being pressed or embedded into the regions with the copper deposits. In this way the surfaces of the bearing parts are protected against damage by the hard foreign bodies. This means that the copper deposits filter out—so to speak—the hard foreign bodies, i.e. the foreign bodies are permanently deposited in the copper-containing deposits.

As already explained, the iron-containing surface layer contains isolated phases of copper which form correspondingly physically isolated regions -of copper. These copper deposits form relatively soft regions, i.e. regions with low hardness in the otherwise relatively hard iron-containing layer. The hardness of these regions of, or containing, copper can amount to e.g. between 80 HV and 200 HV—wherein HV means Vickers Hardness in the conventional manner—and preferably ca. 100 HV, while the iron-containing layer in regions without copper deposits can have hardnesses between 300 HV and 500 HV, preferably a hardness of about 400 HV.

In a particularly advantageous manner, e.g. the surface layer of one of the bearing parts of a wet-lubricated bearing device, such as e.g. the crank shaft of an internal combustion engine and/or the connecting rod in bearing contact therewith and/or the bearing saddle for the crank shaft is provided with an iron-containing surface layer. Such bearings are generally lubricated with a lubricating oil which may contain contamination of all types such as e.g. abraded material which may be produced at a wide variety of points in the internal combustion engine. Although appropriate filter devices are frequently provided such as the oil filter in a petrol or diesel engine of a motor vehicle, these only permit particles greater than a certain size to be effectively filtered out of the lubricant. In particular, smaller particles in the micrometer range are not filtered out, or only insufficiently filtered out so that they pass e.g. between the parts of the crank shaft which are in bearing contact, and at that location cause damage to these bearings over a period of time. However, if the corresponding surfaces are provided with an iron-containing surface layer with copper deposits the damaging contamination is embedded in the soft copper deposits of the surface layer during operation of the bearing so that the surfaces which are in bearing contact are no longer damaged by the contamination i.e. by the dirt particles.

The properties of the copper-containing surface layer which has a lower degree of hardness than the iron-containing surface layer are now described in detail hereinunder.

In an exemplified embodiment which is particularly preferred for practical application the copper-containing surface layer consists of a basic matrix of α-copper. This matrix forms a relatively soft base material for the surface layer with particularly good properties, in particular good sliding properties.

In another preferred exemplified embodiment the bearing device is formed in such a way that the copper-containing surface layer additionally contains 0.01% to 1% by weight of titanium. With the addition of titanium the hardness of the surface layer can be changed within certain limits, which is necessary, e.g. in order to match the pairing of the iron-containing and copper-containing surface layers to each other in an optimum manner.

In order to ensure good running properties for the bearing parts of the bearing device, the bearing device is e.g. formed in such a way that the copper-containing surface layer has deposits of iron and/or cobalt and/or manganese and/or silicon. These materials form hard phases in the surface layer which—in terms of quantity—is dominated by copper. These hard phases form relatively hard regions i.e. regions with greater hardness in the otherwise relatively soft copper-containing layer. The hardness of these hard phases can be between 300 HV and 500 HV, preferably 400 HV, wherein HV means Vickers Hardness in the conventional manner. The copper-containing basic matrix can have a hardness between 80 and 200 HV, preferably 100 HV.

In the case of wet or liquid lubrication, in particular oil lubrication, of the bearing device it is important that the lubricant, such as the oil, is brought well between the two running surfaces of the bearing parts. This is achieved amongst other things by the iron-containing and/or the copper-containing surface layer each having a porosity of 0.5% to 5% by volume, in particular between 1% and 3%. The oil enters the pores and is thereby passed over the running surface, i.e. the pores act as reservoir pockets which contain enough oil or lubricant to ensure lubrication of the bearing parts even under difficult lubricating conditions.

At least one of the two surface layers, i.e. either the iron-containing or copper-containing surface layer or both, are preferably finished after they are applied to the running surfaces of the bearing parts. It has proved to be the case that of all processes, in particular of all machining processes, honing is best suited to finishing the surface. For this reason in a further exemplified embodiment the surface layers are finished by honing.

In an exemplified embodiment which is of particular importance for practical application the crank shaft of an internal combustion engine is fitted with a bearing device in accordance with the invention. For example in a six-cylinder in-line engine the crank shaft can be mounted in four radial sliding bearings, an axial slide bearing and two radial roller bearings. Furthermore, six connecting rods are then mounted on the six crank journals of the crank shaft in six radial sliding bearings. The running surfaces of the stationary bearing parts of the sliding bearings in which such a crank shaft is mounted are provided with one of the special surface layers of the invention which is e.g. a copper base layer.

The crank shaft is in this case provided on the running surfaces of the five sliding bearing sites and on the running surfaces of the crank journals with another of the special surface layers, which is e.g. an iron base layer. Furthermore, the bearing sites of the connecting rods for the crank journals, i.e. the bearing sites of the crank shaft for the connecting rods, hereinafter referred to as connecting rod eyes, are provided with the copper base layer. The running surfaces of the inner and outer rings of the two rolling bearings of the six-cylinder in-line engine given by way of example above, are in this example also provided with this copper base layer. In contrast, in very specific exemplified embodiments, including e.g. balls, rollers, cones etc, the rolling elements of the rolling bearings are in this case provided with the iron base layer.

This means that in all bearing devices mentioned in this exemplified embodiment in bearing parts which are in bearing contact with each other a relatively hard surface layer is paired with a relatively soft surface layer. With these bearing devices in accordance with the invention it is possible to dispense e.g. with the use of bearing shells.

Under special usage conditions e.g. under particularly heavy stress it may be necessary in some circumstances still to use bearing shells. In this case the bearing shells are provided e.g. with a relatively soft surface layer, e.g. with the copper base layer, and the other bearing part which is to be mounted is provided with a relatively hard surface layer, e.g. with the iron base layer. With this bearing device in accordance with the invention e.g. a much longer service life or a greater load-bearing capability is achieved than with the bearing shells known from the prior art.

The invention is described in more detail hereinunder with the aid of the drawing in which, in a schematic view which is not to scale:

Figure 1:
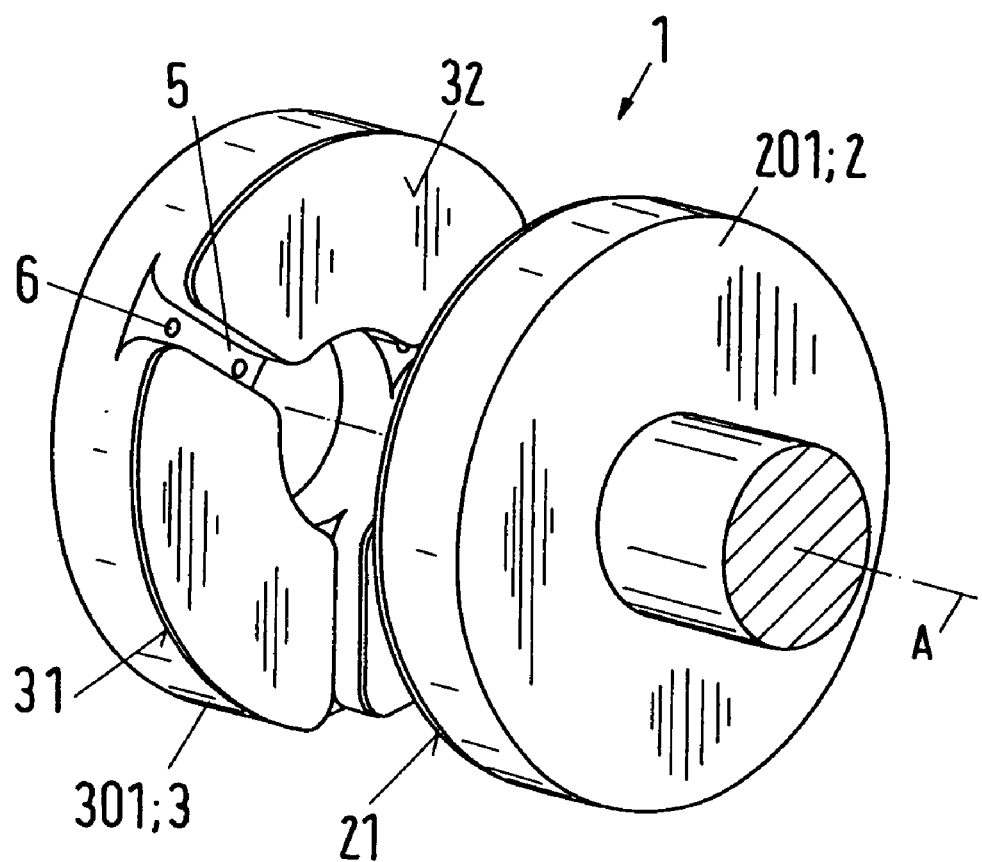
FIG. 1 shows a sliding bearing device in accordance with the invention.

FIG. 1 shows a schematic view of a sliding bearing device 1 in accordance with the invention, which can receive forces in the axial direction, i.e. in the direction of the axis A. The first bearing part 2 is shown in the form of a shaft with a shaft step 201. The running surface with the hard surface layer 21 is located on this shaft step 201. The shaft 201 is supported in the assembled condition on the running surface 32 of the second bearing part 3, in this case in the form of an oil-lubricated support bearing 301. The soft surface layer 31 is formed on the running surface 32 of the support bearing 3. The oil grooves 5 typical for the sliding bearings and the holes 6 for oil supply can also be seen.

In the operating state possible contaminants are pressed into the copper matrix of the soft surface layer 31 of the second bearing part 3 or into the copper regions of the hard surface layer 21 of the first bearing part 2 and cannot damage the surfaces of the two bearing parts.

Figure 2:
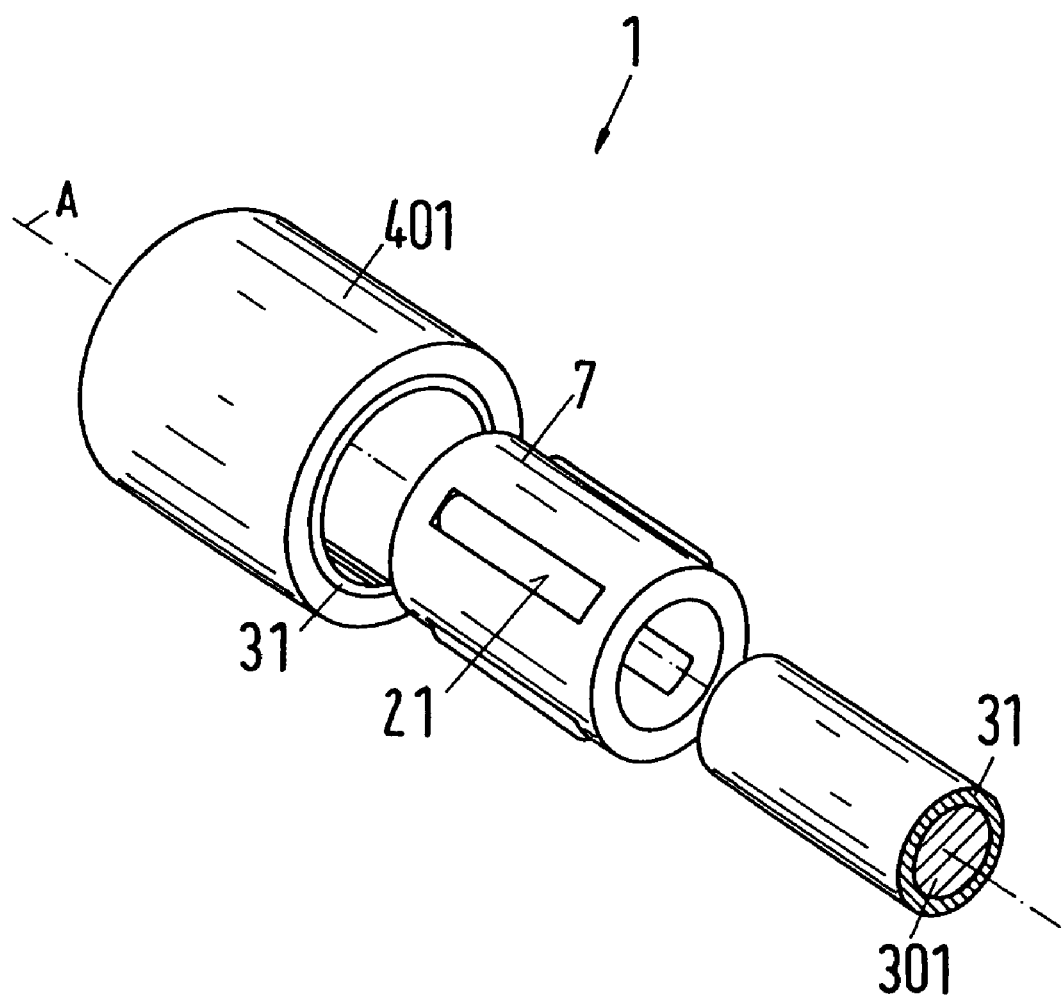
FIG. 2 shows a rolling bearing device in accordance with the invention.

FIG. 2 shows a schematic view of an exemplified embodiment of a bearing device 1 in accordance with the invention in the form of a rolling bearing which is in this case formed as a needle ring 7. The bearing device 1 is shown for greater clarity in the form of an exploded view. In principle a needle ring 7 can also be used together with all shafts and/or needle bushes which have the correct dimensions. The inner and outer rings, known e.g. from the ball bearing, with the running surfaces are generally omitted in this case. The second bearing part 3 is in this case produced by the shaft 301 and the needle bush 401. The first bearing part 2 is in this case distinguished as a rolling body with the iron-containing surface layer 21. The second bearing part 3 is provided with the soft surface layer 31. It will be understood that the first bearing part 2 can also be provided with the soft surface layer 31 and the second bearing part 3 can be provided with the iron-containing surface layer 21.

Figure 3:
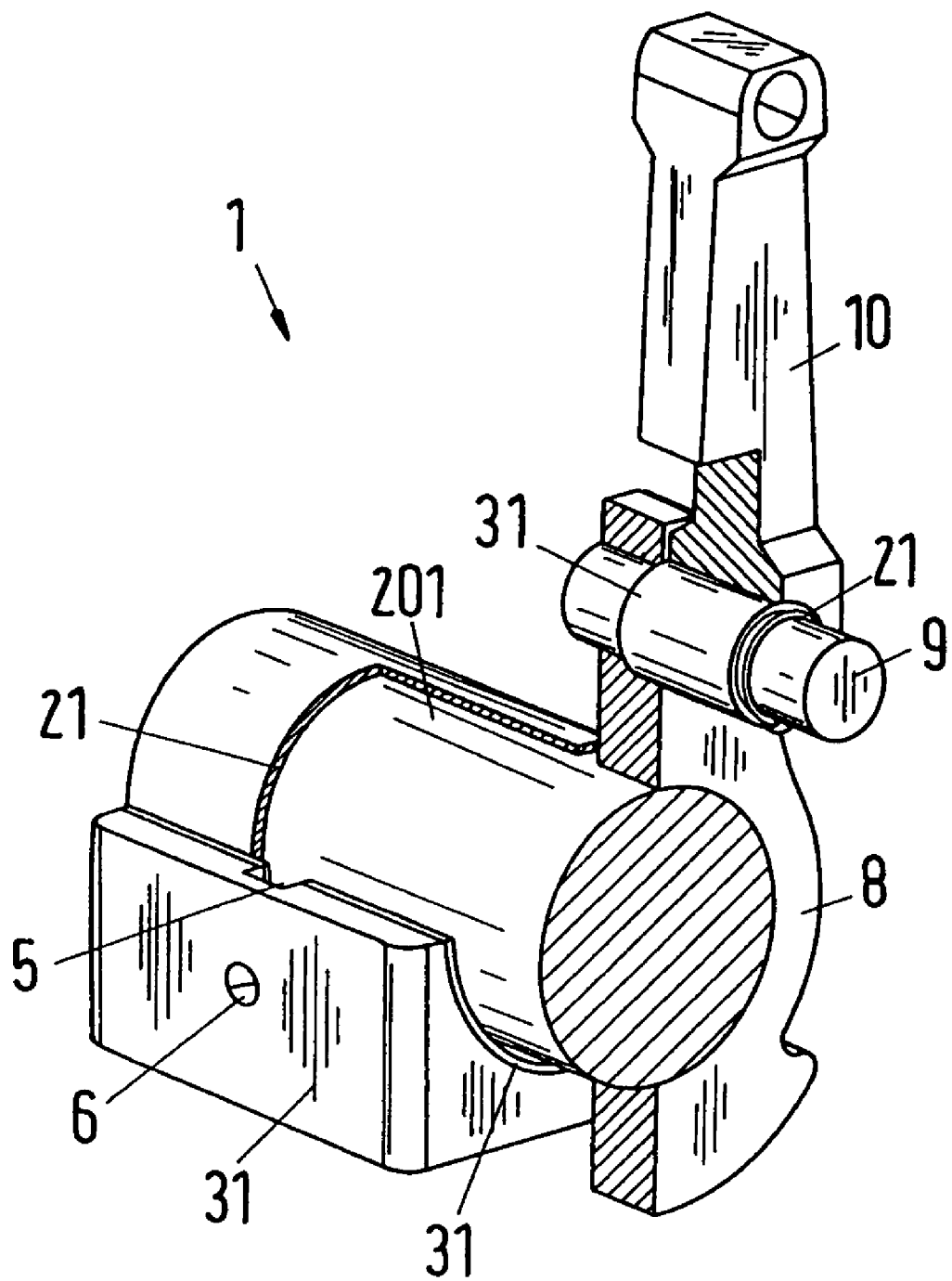
FIG. 3 shows a section of a bearing device in accordance with the invention for a crank shaft.

FIG. 3 shows another exemplified embodiment of a bearing device 1 in accordance with the invention which is of particular significance for practical use. In order to improve clarity parts have been shown in cross-section where this was useful. A section of a bearing device 1 in accordance with the invention of a crank shaft 201 is shown. The upper part of the bearing device 1 is also not shown for reasons of clarity. In the illustrated section the crank shaft 201 is provided with the hard surface layer 21 and mounted in the radial sliding bearing 301. The sliding bearing 301 is provided with the soft surface layer 31. In order to ensure oil lubrication the second bearing part 3, i.e. the sliding bearing 301, an oil groove 5 and holes 6, is introduced for oil supply. A crank 8, a crank journal 9 and a connecting rod 10 are also shown in this case. The crank 8 is shown in cross-section to assist understanding. Amongst other things the crank journal 9, which is provided at the location of the sliding bearing with the connecting rod 10 with the iron-containing hard surface layer 21, is located in the crank 8. The connecting rod is provided at this bearing site with the soft copper-containing surface layer 31. Further details such as bores in the crank shaft for oil lubrication etc have not been shown in the drawing.

Contaminants possibly arising in the operating state are also pressed into the copper matrix of the soft surface layer 31 of the second bearing part 3, i.e. of the sliding bearing 301, or into the copper regions of the hard surface layer 21 of the first bearing part 2, i.e. of the crank shaft 201 and cannot damage the surfaces of the two bearing parts. This process naturally proceeds in a similar manner for the surface layers at the bearing site of the connecting rod.

An important advantage which is achieved by the application of the hard surface layer 21 onto the crank shaft 201 in the region of the sliding bearing 301 is to be seen in the fact that owing to the hard surface layer 21 it is possible to dispense with the hardening (e.g. induction hardening) of the crank shaft 201 in this region, which is separately required without this surface layer. In the exemplified embodiment shown in FIG. 3 the hard surface layer 21 is provided on a crank pin of the crank shaft 201. In the same way this hard surface layer 21 can also be provided on the bearing pins of the main bearing of the crank shaft. In the conventional crank shafts known from the prior art which do not have the hard surface layers 21 it is necessary—in order to avoid premature wear—to harden the bearing sites of the crank shafts in an expensive separate working step. This is generally carried out by induction hardening which is associated with considerable effort and high costs. Furthermore, during the induction hardening of the crank shaft distortions occur at the bearing seats. In order to compensate for these distortions the bearing seats must be produced with a large overmeasure prior to hardening. After the induction hardening the bearing seat diameters are then reduced to the final dimension by grinding (or similar machining processes). By means of the application in accordance with the invention of the hard surface layer 21 to the bearing seats it is advantageously possible to dispense with induction hardening at these sites. The above-mentioned disadvantages of induction hardening are therefore avoided, the crank shafts are produced with low expenditure of energy. No overmeasure or a clearly reduced overmeasure at the bearing seats with respect to the prior art is required, the crank shaft is not subject to any distortion and it has a reduced tendency to fissuring than conventional induction-hardened crank shafts.

A further important advantage of the invention is that by using the coatings in accordance with the invention for the bearing device it is possible to dispense with oil channel bores in the crank shaft. In the case of the crank shafts known form the prior art oil channel bores are formed in the crank shaft body and serve to achieve better lubrication of the main and crank bearings of the crank shaft. The oil flow through these bores ensures that oil is distributed on the surface of the bearings in sufficient quantity that a reduction in friction and wear between the contact surfaces of the bearing is achieved. The production of the oil channel bores is associated with considerable effort and high costs. Furthermore, the oil channel bores can lead to the formation of fissures and they reduce the dynamic strength of the crank shaft.

By means of the surface layer provided in accordance with the invention on the surface of the main and crank bearing of the crank shaft a sufficient reduction in friction and wear of the bearing arrangement is achieved without additional oil having to be transported via oil channel bores to the bearing surfaces in order to reduce friction and wear. It is therefore possible to dispense with the separate oil channel bores in the crank shaft. Although dispensing with oil channel bores leads to a reduction in the oil lubrication of the main and crank bearing, this is compensated for by the coating in accordance with the invention of the parts of the bearing relationship. To this end material combinations which are particularly suitable in accordance with the invention are provided, which have suitable tribological properties in order to achieve sufficiently low friction even without additional oil brought in via oil channel bores and to achieve sufficiently low wear of the parts of the bearing relationship.

The positive influences of conventional oil lubrication by means of oil channel bores on the tribological system consisting of the bearing surface of the crank shaft and corresponding counter body are achieved in accordance with the invention by deliberately chosen materials which are applied in the form of surface coatings. As a counter body to the bearing seats of the crank shaft it is possible for [lacuna] to consist of two half shells with soft alloys on their surface which are applied in the form of surface layers. Alternatively, however, the counter bodies can also be formed directly by the corresponding bearing seat of the components to be mounted, such as, e.g. the inner surfaces of the connecting rod eyes.

By the use of the surface layers in accordance with the invention on the individual bearing parts it is not only possible to dispense with the production of the oil bores themselves, the deburring and polishing of the bore ends are also omitted. Furthermore, a lower tendency towards fissuring and a higher dynamic rigidity in the crank shaft is achieved.

The invention claimed is:

1. A bearing device with a first bearing part and a second bearing part which cooperate in bearing contact, wherein:
   the first bearing part and the second bearing part are each provided with a surface layer;
   hardness of the surface layer of the first bearing part is greater than hardness of the surface layer of the second bearing part; and
   the surface layer of the first bearing part is an iron-containing surface layer, which comprises at least the following composition:
   carbon=0.1% to 1.5% by weight
   manganese=0.1% to 8% by weight
   sulphur=0.1% to 2% by weight
   copper=0.1% to 12% by weight
   iron=to make up to 100% by weight.

2. Bearing device as claimed in claim 1, wherein the bearing device is a crank shaft bearing with a connecting rod of an internal combustion engine.

3. The bearing device as claimed in claim 1, wherein the iron-containing surface layer additionally contains 0.01% to 0.2% by weight of phosphorous.

4. The bearing device as claimed in claim 1, wherein the iron-containing surface layer additionally contains 5% to 20% by weight of chromium.

5. The bearing device as claimed in claim 1, wherein the iron-containing surface layer additionally contains 0.1% to 20% by weight of molybdenum.

6. The bearing device as claimed in claim 1, wherein the iron-containing surface layer contains MnS as a dry lubricant and the manganese portion is between 0.5% and 1.5% by weight.

7. The bearing device as claimed in claim 6, wherein the manganese portion is 1% by weight.

8. The bearing device as claimed in claim 1, wherein the iron-containing surface layer has a basic matrix of α-iron.

9. The bearing device as claimed in claim 1, wherein the iron-containing surface layer contains carbides.

10. The bearing device as claimed in claim 1, wherein the iron-containing surface layer has copper deposits which form a copper matrix.

11. The bearing device as claimed in claim 1, wherein the iron-containing surface layer has a porosity of 0.5% to 5% by volume.

12. The bearing device as claimed in claim 1, wherein the surface layer of the second bearing part is a copper-containing surface layer which has at least the following composition:
zinc=5% to 30% by weight
tin=1% to 10% by weight
silicon=0.1% to 3% by weight
aluminum=0.1% to 7% by weight
iron=0.01% to 2% by weight
manganese=0.01% to 4% by weight
cobalt=0.01% to 3% by weight
copper=to make up to 100% by weight.

13. The bearing device as claimed in claim 12, wherein the copper-containing surface layer additionally contains 0.01% to 1% by weight of titanium.

14. The bearing device as claimed in claim 12, wherein the copper-containing surface layer has a basic matrix of α-copper.

15. The bearing device as claimed in claim 12, wherein the copper-containing surface layer comprises deposits of iron and/or cobalt and/or manganese and/or silicon.

16. The bearing device as claimed in claim 12, wherein the copper-containing surface layer has a porosity of 0.5% to 5% by volume.

17. The bearing device as claimed in claim 12, wherein the copper-containing and/or iron-containing surface layer is finished by honing.

18. A crank shaft with bearing seats in the form of crank pins for mounting connecting rods and main bearings for mounting the crank shaft with respect to an engine housing, wherein at least one bearing seat forms a part of a bearing device as claimed in claim 3, wherein this bearing seat comprises said iron-containing surface layer, applied to the non-hardened material of the crank shaft.

19. The crank shaft as claimed in claim 18, wherein all crank pins and all main bearings of the crank shaft are provided with the surface layer and the crank shaft body has no oil channel bores.

20. A crank shaft with bearing seats in the form of crank pins for mounting connecting rods and main bearings for mounting the crank shaft with respect to an engine housing, wherein:
at least one bearing seat forms a part of a bearing device with a first bearing part and a second bearing part which cooperate in bearing contact;
the first bearing part and the second bearing part are each provided with a surface layer;
the hardness of the surface layer of the first bearing part is greater than the hardness of the surface layer of the second bearing part;
said bearing seat comprises an iron-containing surface layer applied to the non-hardened material of the crank shaft and having at least the following composition,
carbon=0.1% to 1.5% by weight
manganese=0.1% to 8% by weight
sulphur=0.1% to 2% by weight
copper=0.1% to 12% by weight
iron=to make up to 100% by weight,
the iron-containing surface layer additionally contains 0.01% to 0.2% by weight of phosphorous.

* * * * *